United States Patent [19]

Spektor et al.

[11] Patent Number: 5,719,501
[45] Date of Patent: Feb. 17, 1998

[54] MINE SIMULATION SYSTEM HAVING AN ELECTROMAGNETIC FIELD DISTURBING DEVICE

[75] Inventors: Moshe Spektor; Gil Shalev, both of Beer-Sheva; Boaz Kartoon, Metar, all of Israel

[73] Assignee: Israeli Aircraft Industries, Ltd., Israel

[21] Appl. No.: 553,884

[22] Filed: Nov. 6, 1995

[30] Foreign Application Priority Data

Nov. 8, 1994 [IL] Israel ................... 111556

[51] Int. Cl.⁶ ............... G01V 3/165; G01V 3/10; F41A 33/00; F42B 8/28
[52] U.S. Cl. ............... 324/345; 89/1.13; 324/326; 324/258; 434/1
[58] Field of Search ............... 324/67, 326, 345, 324/244, 245, 253, 254, 258, 260; 434/1, 11; 180/167; 89/1.13; 102/417, 425, 427; 340/551

[56] References Cited

U.S. PATENT DOCUMENTS

| | | | |
|---|---|---|---|
| 2,379,447 | 7/1945 | Lindsey | 324/258 |
| 2,976,483 | 3/1961 | Moore et al. | 324/245 |
| 2,983,865 | 5/1961 | Wenner | 324/326 X |
| 3,201,562 | 8/1965 | Anderson | 324/260 X |
| 3,894,283 | 7/1975 | Schonstedt | 324/345 |
| 4,021,725 | 5/1977 | Kirkland | 324/345 |
| 4,119,908 | 10/1978 | Cosman et al. | 324/67 X |
| 4,181,879 | 1/1980 | West et al. | 324/326 |
| 4,425,097 | 1/1984 | Owens | 434/219 |
| 4,719,426 | 1/1988 | Weiss | 324/345 |
| 4,766,385 | 8/1983 | Polvani | 324/345 |
| 5,027,709 | 7/1991 | Slagle | 102/427 |
| 5,074,793 | 12/1991 | Hambric et al. | 434/11 |
| 5,321,361 | 6/1994 | Goodman | 324/326 |

FOREIGN PATENT DOCUMENTS

| | | |
|---|---|---|
| 0 338 901 | 10/1989 | European Pat. Off. . |
| 0 364 126 | 4/1990 | European Pat. Off. . |
| 24 55 769 | 8/1976 | Germany . |
| 26 33 964 | 3/1979 | Germany . |
| 34 24 231 | 1/1986 | Germany . |
| 34 44 037 | 6/1986 | Germany . |
| 35 05 172 | 8/1986 | Germany . |
| 37 22 805 | 1/1989 | Germany . |
| 39 30 345 | 3/1991 | Germany . |
| 41 35 225 | 4/1993 | Germany . |
| 109977 | 8/1980 | Japan .................... 324/345 |
| 4-281200 | 10/1992 | Japan . |
| 585259 | 12/1977 | Russian Federation . |
| 1087805 | 4/1984 | Russian Federation . |
| 87/04254 | 7/1987 | WIPO .................... 324/258 |

OTHER PUBLICATIONS

McGraw-Hill, *Dictionary of Scientific and Technical Terms*, "differential instrument" definition, (no date).
Grady C. Carroll, "Industrial Process Measuring Instruments", McGraw-Hill Book Company, Inc., p. 24, (1965).
A.M. Turichin, Electricheskie Izmerenia Neelectricheskikh Velichin, version 3, Moskwa, Leningrad, 1959, Phc. 8–5.
G. D. Frumkin, Rashyot ee Konstruirovanie Radio Apparaturi, version 2, "Visshaia shkola", Moskwa, 1968, p. 83.
Bernsten, "There's more than one way to economically reference any survey monument permanently", Brochure of Bernsten Inc. Jun. 1982.

*Primary Examiner*—Gerard R. Strecker
*Attorney, Agent, or Firm*—Merchant, Gould Smith, Edell Welter & Schmidt, P.A.

[57] ABSTRACT

A mine simulation system includes a magnetic field disturbance sensing apparatus carried by a moving vehicle and a plurality of randomly distributed passive permanent magnetic field disturbing devices located on the ground and simulated as mines. The sensing apparatus detects a magnetic field disturbance caused by the presence of any one of the passive permanent magnetic field disturbing devices when the vehicle comes into proximity of one passive permanent magnetic field disturbing device. A method for training personnel in mine field action can use this mine simulation system by entering the training vehicle into an area where the magnetic field of the earth has been disturbed by the presence of the passive permanent magnetic field disturbance device. When the training vehicle comes into proximity of one passive permanent magnetic field disturbance device, an output voltage is generated in the sensing apparatus detectable by a personnel being trained.

16 Claims, 5 Drawing Sheets

MINE SIMULATION SYSTEM HAVING AN ELECTROMAGNETIC FIELD DISTURBING DEVICE

FIELD OF THE INVENTION

The present invention relates to a system which is capable of simulating the presence of mines in an area in which one or more vehicles move. Particularly, the invention relates to electromagnetic apparatus for simulating mine fields, for training purposes.

BACKGROUND OF THE INVENTION

Mines are widely used in warfare, for the purpose of disabling vehicles and their crews. Vehicles which are affected by mines are virtually of all types, and include light vehicles, e.g., jeeps, and armored vehicles, such as tanks. Mines are of different types, and can be distributed both in open fields or on roads and trails. In many instances, mines are positioned in a way that they are visible to the trained eye, and a driver or crew member who become aware of it may avoid coming into contact with it. It should be mentioned that there are several varieties of actuating mechanisms for mines, some of which do not need actual physical contact with the vehicle, as they are activated by the presence of a metallic mass at a given distance. Therefore, the ability to identify the mine in a timely manner, and to circumvent it, is of paramount importance. Of course, like most skills, the ability of recognizing mines, in different light conditions and on different terrain, is also a stroll that must be trained in order to maintain and improve such ability.

THE PRIOR ART

The art has addressed the question of simulating battlefield mine action. For instance, DE 4135225 employs a sensor in the mine, working like a conventional system by responding to a signal emitted by the target. A similar system is provided in U.S. Pat. No. 5,074,798, which uses an authentic land mine activator, radio transmitter and logic providing RF signal when activated by the proximity a vehicle.

Another system, described in DE 3505172, comprises a dye reservoir, which is detonated to stain the vehicle being hit. Other complicated systems, e.g., as described in DE 2638964, comprise electromagnetic radiation beam transmitters, used as firing signals in the target direction, and receivers which are carried by mobile participants in the exercise.

The prior art systems present several severe drawbacks. Firstly, they are expensive and complicated. Secondly, in most cases they are active systems, which require the use of powerful transmission equipment, which must be carried by the vehicle. Thirdly, in many cases the simulated mines are expensive and sensitive, because they comprise RF equipment. The art has so far failed to provide a mine action simulation system which is simple, inexpensive, and which does not require expensive transmission equipment.

SUMMARY OF THE INVENTION

It is an object of the present invention to provide a mine action simulation system which is simple, relatively inexpensive, and which overcomes the drawbacks of prior art systems.

It is another object of the invention to provide a mine action simulation system which operates in a passive way, and which does not require transmission equipment.

It is yet another object of the invention to provide apparatus for crew members of vehicles in the movement through mine fields and/or in the identification of dispersed mines.

It is still another object of the invention to provide a system of the type referred above, which is highly sensitive and which prevents the occurrence of false alarms (or "false hits").

It is a further object of the invention to provide a method for identifying magnetic object found on the ground, which is particularly suited for action simulation.

Other objects of the invention will become apparent as the description proceeds.

In one aspect, the invention is directed to magnetic field disturbance sensing apparatus, comprising a metallic core onto which two identical windings are mounted, the windings being connected to one another with opposing polarities at one end, and the remaining two ends of the windings being connected to voltage measuring means. The apparatus may further comprise logic means to determine when a predetermined threshold value has been exceeded, which represents the upper value of the tolerance of the apparatus. According to a preferred embodiment of the invention, the magnetic field is the magnetic field of the earth.

In another aspect, the invention is directed to a system for training minefield action, comprising a magnetic field disturbance sensing apparatus as described above, and one or more magnetic field disturbing devices. According to a preferred embodiment of the invention, the magnetic field disturbing device comprises s magnetic material. Preferably, when the system is used for training in minefield action, the magnetic field passive disturbing device has the appearance of a real mine.

The system of the invention may further comprise signaling means to signal when a magnetic field disturbance sensing apparatus has come near a magnetic field passive disturbing device, resulting m a voltage output which simulates a mine explosion. Such signaling means may comprise. e.g., a light.

In a Further aspect, the invention is directed to a method of training in minefield action, comprising providing one or more magnetic field disturbing device(s) located on the ground, and causing a magnetic field disturbance sensing apparatus, mounted on the training vehicle, and comprising a metallic core onto which two identical windings are mounted, the windings being connected to one another with opposing polarities at one end, and the remaining two ends of the windings being connected to voltage measuring means, to enter the area where the magnetic field of the each has been disturbed by the magnetic field passive disturbing device(s), thereby generating an output voltage.

All the above and other characteristics and advantages of the invention will be better understood through the following illustrative and non-limitative description of preferred embodiments, with reference to the appended drawings.

DETAILED DESCRIPTION OF THE PREFERRED EMBODIMENTS

Figure 1:
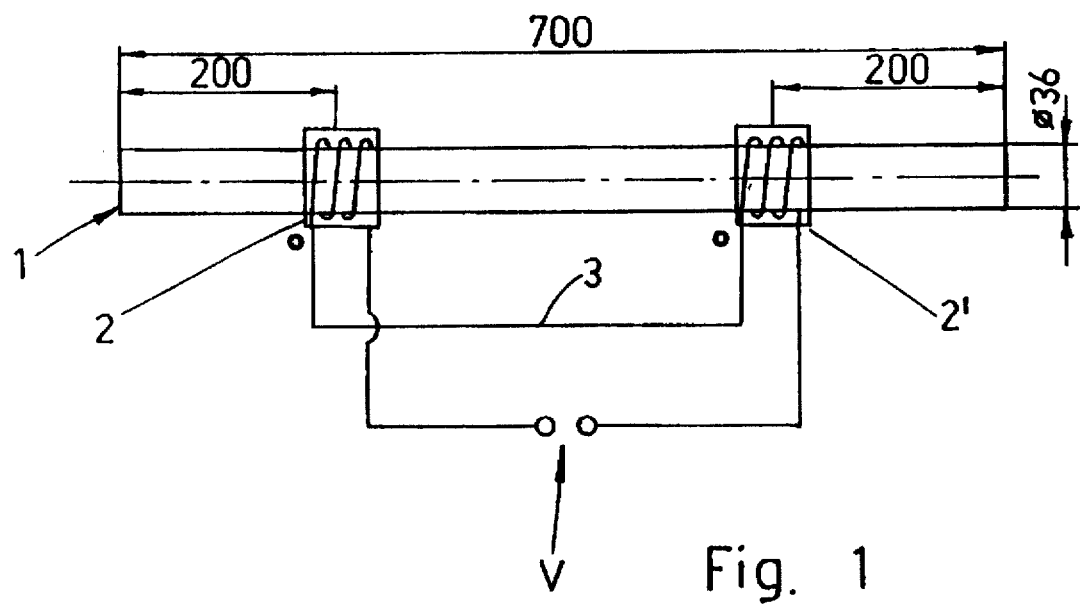
FIG. 1 schematically illustrates a sensor according to one embodiment of the invention.

FIG. 1 illustrates sensing means according to one preferred embodiment of the invention. The sensing means comprise a metallic core 1, onto which two identical windings, 2 and 2', are mounted. The windings are connected with opposing polarities, through line 3, and the remaining two ends of the windings are connected to voltage measuring means V (not shown).

The sensing means operate as follows: The metallic core 1 is mounted with its axis parallel to the ground, and the voltage measuring means V are zeroed so that no voltage is measured at V. When the vehicle moves, the axis of the metallic core 1 undergoes both vertical and horizontal movements, and angular movements. Since the metallic core 1 is found in the magnetic field of the earth, each substantial movement (such as a substantial slope of the vehicle), causes a change in the magnetic field surrounding the metallic core, and thus an electric current is generated in each of the windings 2 and 2'. When the change is due to movement in the large field of the earth, however, the changes along the axis of the whole core 1 are homogeneous, so that the current generated in the winding 2 is essentially the same as that generated in the winding 2' (except, of course, a tolerance due to small differences in the windings, irregularities of the core, etc.). Since the two windings are connected "head-to-head", in this situation the currents generated cancel out, and no voltage is read at V.

While the dimensions of the sensing device are not critical, and the skilled engineer will be able to provide devices of very different sizes, the following illustrative dimensions are given for the device of FIG. 1, wherein the core is made of iron: Core diameter: 36 mm; core length: 700 mm; distance between the center of each winding to the nearest edge of the core: 200 mm; number of turns in the windings: 10,000; diameter of the wire: 0.05 mm.

As stated, logic circuits are provided order to decide when a measured voltage is due to small variations in the homogeneous field of the earth, or to other disturbances, and when it derives from a training mine. Providing such logic circuits, as well as determining for each case threshold values for the measured voltage, is of course within the scope of the routineer, and is therefore not described herein in detail, for the sake of brevity.

In principle, the logic circuit will check measured values and compare them with setup values of the system. In one illustrative embodiment of the invention, the following setup parameters are used:

Min-Value: The lowest expected voltage to be measured near the magnetic field. This parameter is used to filter noise.

Max-Value: The highest expected voltage to be measured near the magnetic field. The parameter is used to filter noise and to determine when the system nears the magnetic field.

Rate: The rate at which the setup and measured values are compared.

Filter: Criteria for the filtering of noise.

Slope: The maximal difference between the previous measured parameter value and the next parameter value. Used for filtering noise.

Min-Time: The shortest time between the appearance of a signal and its disappearance. Used to identify a true signal.

Max-Time: The longest time between the appearance of a signal and its disappearance. Used to identity a true signal.

Mini-Integral: The lowest value of the total readings in a true signal from appearance and up to disappearance. Used to identify a true signal.

Max-Integral: The highest value of the total readings in a true signal from appearance and up to disappearance. Used to identify a true signal.

Based on the desired functioning of the system, different setup values will be provided, as understood by the skilled person. As will be apparent to the skilled person, different parameters and different sets of parameters can be used for the purposes of the invention. The above set, therefore, is only provided inasmuch as it has been found to be a convenient set of parameters for analyzing the signal generated in the magnetic sensor passing over a magnetic field disturbance element. This set, however, can be replaced by any other suitable set, and is not intended to limit the invention in any way.

Figure 2:
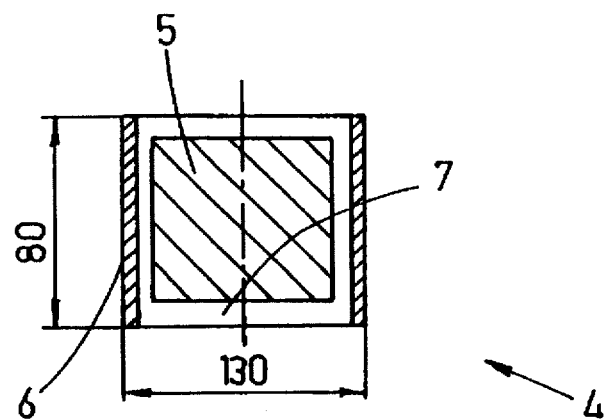
FIG. 2 is a schematic cross-section of a simulated mine, according to one preferred embodiment of the invention.

FIG. 2 shows a magnetic field disturbing device 4, which operates as a simulated mine, viewed in cross-section. This device consists essentially of a permanent magnetic material 5, included in a casing 6. The magnetic material may be of any suitable type, but of course stronger magnetic materials will require smaller amount of material to provide the desired effect and, therefore, can be used to produce smaller devices. Illustrative magnetic materials are, e.g., AlNiCo materials, or ferrites. Suitable magnetic materials will be recognized by the skilled person and are, therefore, not discussed herein in detail The magnetic material can be embedded in a filing material, 7, which can be of any suitable type. Representative dimensions of a tubular magnetic field passive disturbing device to be used in connection with the sensor of FIG. 1, are: external diameter: 130 mm; height: 80 mm. Thus, it can be seen that a very small device is needed in order to provide a substantial disturbance of the magnetic field. The housing of the device can be made of any suitable material, plastic materials being preferred.

Figure 3A:
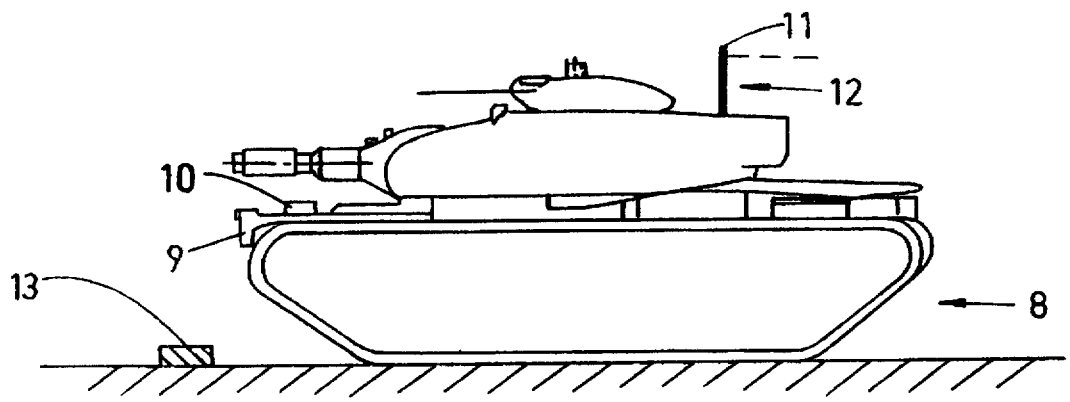
FIG. 3A is a lateral view of an apparatus according to the invention, mounted on an M-60 tank.
Figure 3B:
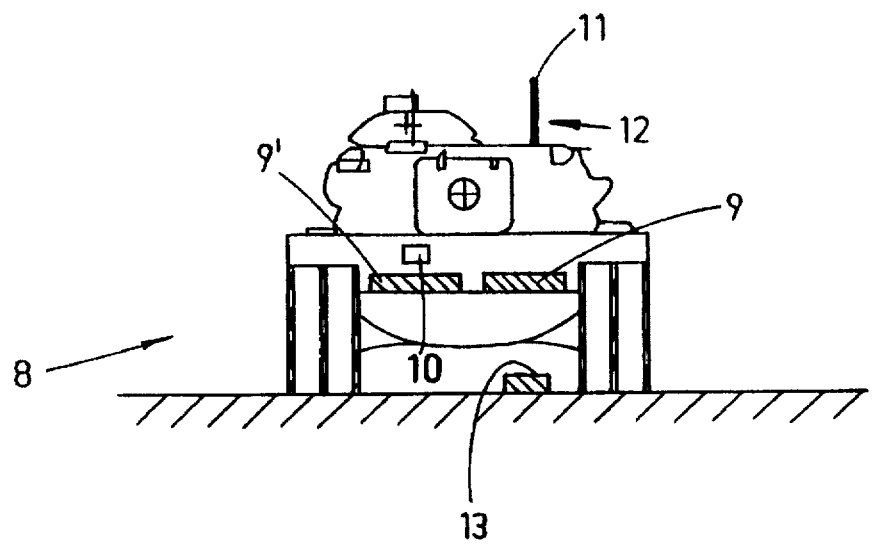
FIG. 3B is a front view of an apparatus according to the invention, mounted on an M-60 tank.

The sensing device of FIG. 1 can be used alone in a given system, or two or more such devices can be used, depending on the width of the vehicle which it is desired to cover. Each sensor operates independently, and covers a given area, so that the number of such sensors is not limited. An example of such a situation is given in FIGS. 3A, 3B where the device of FIG. 1 is used on an M-60 tank (indicated by numeral 8). Given the width the M-60, one sensor is not sufficient, and two such sensors, 9 and 9', are mounted on its front (FIG. 3B). According to this embodiment of the invention, the electronic control means which activate the system are located in box 10, which is connected to the sensors 9 and 9' through appropriate wires (not shown). Box 10 contains the logic means described above, as well as any other electronic parts which it is desired to add to the system. Such additional parts can be many, but are all conventional and, therefore, are not described herein. For instance, however, signaling means can be provided to indicate when a vehicle has been hit by a mine which has exploded. In the embodiment of FIGS. 3A, 3B the signaling means comprise a light, 11, positioned on a high shaft, 12, so as to be visible, which lights up when the tank has come near a mine 13, as shown in the figure.

EXAMPLE

Figure 4:
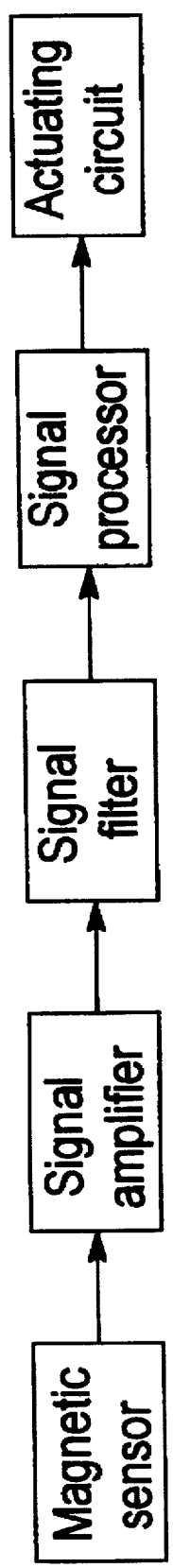
FIG. 4 schematically shows the elements of a system, according to one embodiment of the invention.

In order to illustrate the invention further, a system was built and tested on an M60 tank. The system was positioned on the tank as illustrated in FIGS. 3A, 3B The block diagram of the system is schematically shown in FIG. 4. It comprises a magnetic sensor (1), which senses the change in magnetic field above the simulated mine, and which generates as a result an electric signal, as described above. A signal amplifier (2) amplifies the signal generated by the sensor (1), which is normally a weak signal. A signal filter (3) filters noise at a frequency higher than 100 Hz, which appear in the signal generated by the magnetic sensor (1). The signal processor (4) is an electronic circuit which checks whether the signal generated by the magnetic sensor is similar, within a predetermined limit, to the expected signal generated when the magnetic sensor passes over the simulation mine. The expected value is known from pre-testing of the system. If the signal is sufficiently similar (according to criteria which can be changed from time to time, in each specific system), the circuit generates an appropiate "approval" signal. The signal, which indicates that the sensor has sensed "a mine" is fed to an actuating circuit (5), which actuates the appropriate output which shows that the tank has been hit by a mine. The output can include, e.g., light, audio, smoke or pyrotechnic signals, or any other desired output.

All the circuits which constitute the elements of the system are well known to the skilled person, and therefore are not described herein in detail, for the sake of brevity.

Figure 5:
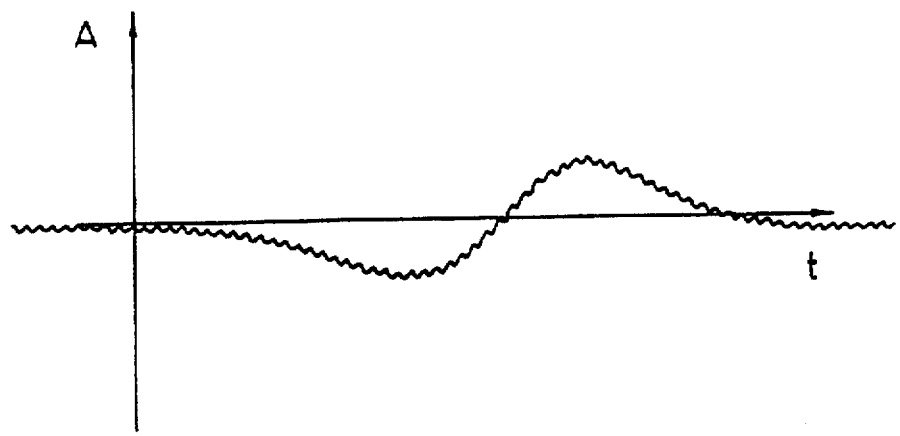
FIGS. 5–8 are voltage measurements taken at different speeds from a sensor passing above a simulated mine.
Figure 6:
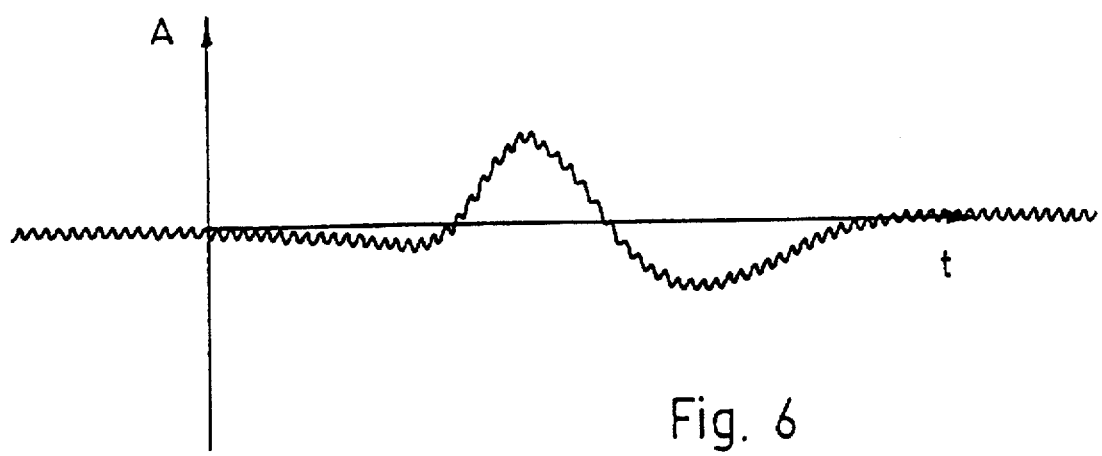
Figure 7:
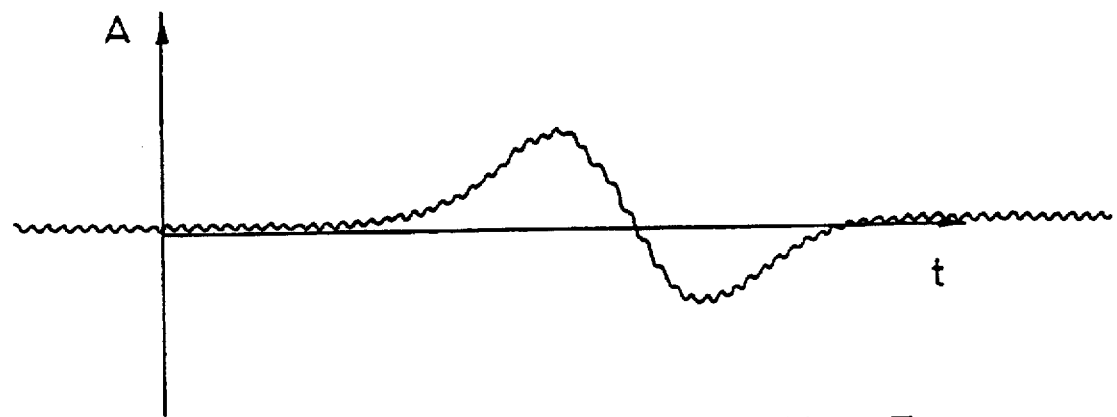
Figure 8:
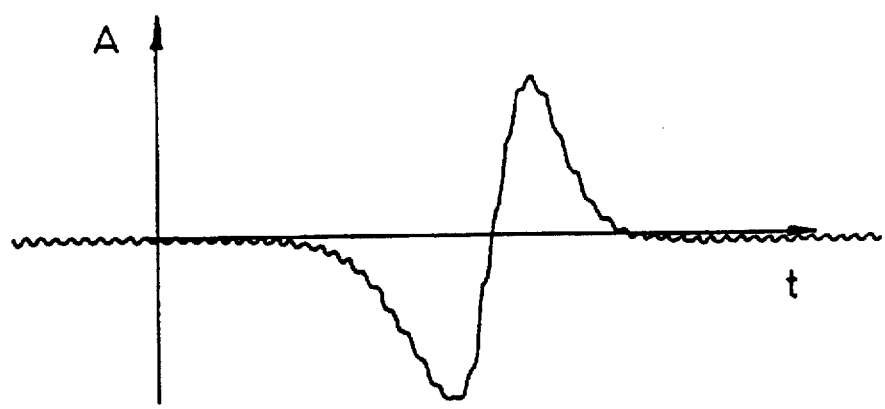

The test was carried out at four different traveling speeds of the tank, and was recorded on a recorder operating with a paper speed of 100 mm/s, with a voltage recording of 50 mV/cm. The magnetic device employed to disturb the magnetic field was the representative device having the dimensions described above, and filled with ferrite. The results are shown in FIGS. 5 through 8, as follows:

FIG. 5: Traveling speed of 4 Km/h
FIG. 6: Traveling speed of 6 Km/h
FIG. 7: Traveling speed of 7 Km/h
FIG. 8: Traveling speed of 11 Km/h As can be seen, the signal obtained is, as expected, proportional to the traveling speed of the tank (viz., of the sensor). However, even at the relatively low speed of 4 Km/h (FIG. 5) the signal generated by the sensor is unequivocal and sufficient to prime a reaction indicating that the tank has passed over a mine.

As will be appreciated by the skilled person, the system of the invention comprises only passive elements, viz., a disturbing device for disturbing the magnetic field of the earth, and windings which generate an electric potential when the magnetic field applied to the core on which they are wound changes. This system is simple and relatively inexpensive, and can be provided in very many variations, with a variety of additions and optional features, without exceeding the scope of the invention.

It should further be mentioned that the sensing device of the invention can be used alone for the purpose of locating objects which create a disturbance of the magnetic field, for any purpose that this may become desirable, and therefore the invention is by no means limited to a system comprising training simulated mines, nor is it limited to simulation purposes only.

We claim:

1. A mine simulation system, comprising:
   a magnetic field disturbance sensing apparatus carried by a moving vehicle; and
   a plurality of randomly distributed passive permanent magnetic field disturbing devices located on the ground and simulated as mines, said sensing apparatus being capable of detecting a magnetic field disturbance caused by the presence of any one of said plurality of passive permanent magnetic field disturbing devices when said vehicle comes into proximity of said any one passive permanent magnetic field disturbing device.

2. A mine simulation system according to claim 1 wherein the sensing apparatus comprises a metallic core onto which two identical windings are mounted, said windings being connected to one another with opposing polarities at one end, and the remaining two ends of the windings being connected to voltage measuring means.

3. A mine simulation system according to claim 2, wherein the sensing apparatus further comprises logic means to determine when a predetermined threshold value has been exceeded, which represents an upper value of a tolerance of the sensing apparatus.

4. A mine simulation system according to claim 1, wherein the magnetic field disturbance caused by each of said plurality of passive permanent magnetic field disturbing devices is a disturbance in a magnetic field of the earth.

5. A mine simulation system according to claim 1, wherein each of said plurality of passive permanent magnetic field disturbing devices is selected from among AlNiCo materials.

6. A mine simulation system according to claim 1, wherein each of said plurality of passive permanent magnetic field disturbing devices has an appearance of a real mine.

7. A mine simulation system according to claim 1 further comprising signaling means to signal when the magnetic field disturbance sensing apparatus has come near one of said plurality of passive permanent magnetic field disturbing devices, resulting in a voltage output which simulates a mine explosion.

8. A mine simulation system according to claim 7 wherein the signaling means comprise a light.

9. A method for training personnel in minefield action, comprising the steps of;
   providing a plurality of randomly distributed passive permanent magnetic field disturbing devices located on the ground capable of causing a magnetic field disturbance in a magnetic field of earth detectable by a magnetic field disturbance sensing apparatus;
   mounting the magnetic field disturbance sensing apparatus on a training vehicle, said apparatus being capable of generating an output voltage when brought into proximity with any one of said plurality of passive permanent magnetic field disturbance devices; and
   entering said training vehicle into area where the magnetic field of the earth has been disturbed by presence of said plurality of passive permanent magnetic field disturbance devices, and when said training vehicle comes into proximity of one of said passive permanent magnetic field disturbance devices, an output voltage is generated in said sensing apparatus detectable by a personnel being trained.

10. A method according to claim 9, wherein said sensing apparatus comprises a metallic core onto which two identical windings are mounted, said windings being connected to one another with opposing polarities at one end, and remaining two ends of the windings being connected to voltage measuring means.

11. A method according to claim 9, further comprising a step of providing logic means operatively linked to said sensing apparatus, to determine when a predetermined threshold value has been exceeded, which represents an upper value of a tolerance of the apparatus, and indicating that a mine has exploded only when the predetermined threshold value has been exceeded.

12. A method according to claim 9, wherein each of said plurality of passive permanent magnetic field disturbing devices comprises a magnetic material.

13. A method according to claim 12, wherein each of said plurality of passive permanent magnetic field disturbing devices is selected from among AlNiCo materials.

14. A method according to claim 9, wherein each of said plurality of passive permanent magnetic field disturbing devices has an appearance of a real mine.

15. A method according to claim 9, further comprising a step of providing signaling means operatively linked to said sensing apparatus to signal when the magnetic field disturbance sensing apparatus has come near one of said plurality of passive permanent magnetic field disturbing devices, resulting in a voltage output which simulates a mine explosion.

16. A method according to claim 15, wherein the signaling means comprise a light.

* * * * *